United States Patent [19]

Noble

[11] 4,118,126
[45] Oct. 3, 1978

[54] METHOD OF LOCATING A LIGHT AT THE FOCAL POINT OF A CONCAVE MIRROR OF A SIGNAL LAMP UNIT

[75] Inventor: Peter M. Noble, Valencia, Pa.

[73] Assignee: Westinghouse Air Brake Company, Swissvale, Pa.

[21] Appl. No.: 770,643

[22] Filed: Feb. 22, 1977

[51] Int. Cl.² .............................................. G01J 1/00
[52] U.S. Cl. .................................... 356/123; 316/23; 356/255; 362/285
[58] Field of Search ............................. 356/123–127, 356/255, 252; 316/23, 29; 33/297–298, 264, 288; 343/703; 313/146; 362/285–289, 429

[56] References Cited

U.S. PATENT DOCUMENTS

| | | | |
|---|---|---|---|
| 2,002,477 | 5/1935 | Merkel | 356/123 |
| 2,520,866 | 8/1950 | Wells | 356/123 |
| 3,418,052 | 12/1968 | Hoffmann | 356/123 |

*Primary Examiner*—John K. Corbin
*Assistant Examiner*—Wm. H. Punter
*Attorney, Agent, or Firm*—J. B. Sotak; R. W. McIntire, Jr.

[57] ABSTRACT

A method of locating the filament of a light bulb at the focal point of a parabolic reflector comprising the steps of placing an optical instrument into the electrical socket for the light bulb, positioning the electrical socket and optical instrument until a reticle of the optical instrument is situated at the focal point of the parabolic reflector, and replacing the optical instrument by a light bulb.

10 Claims, 3 Drawing Figures

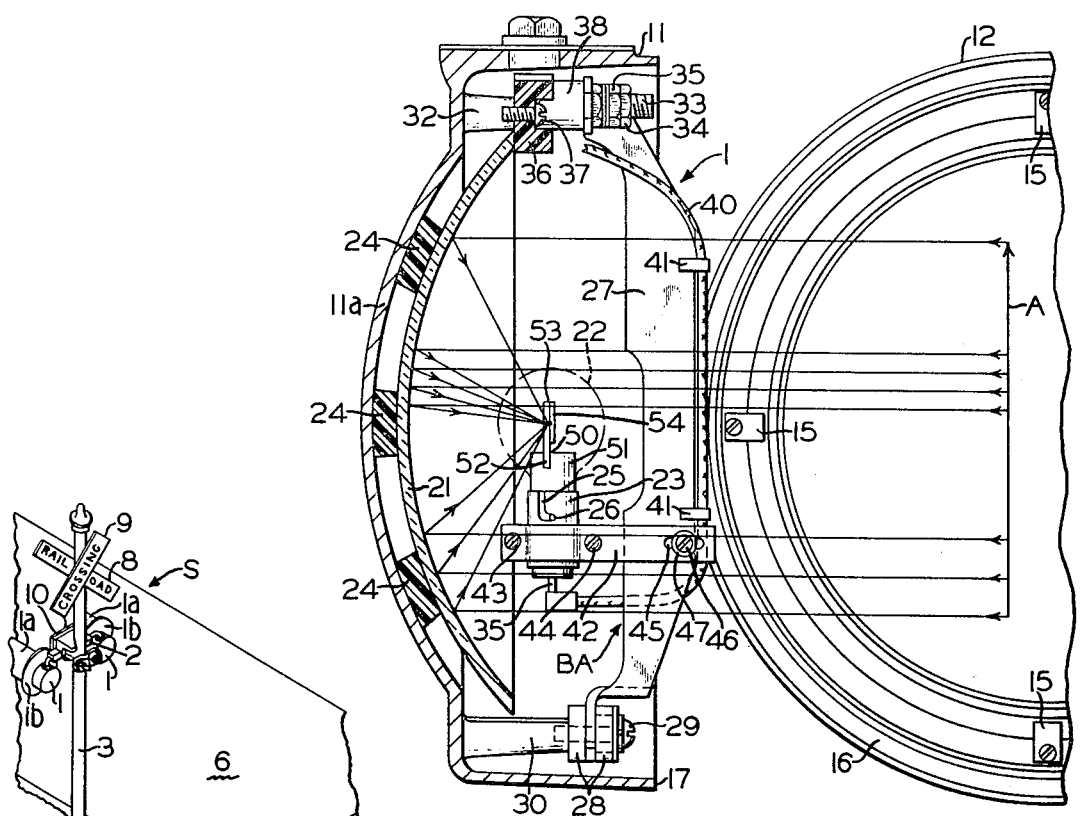
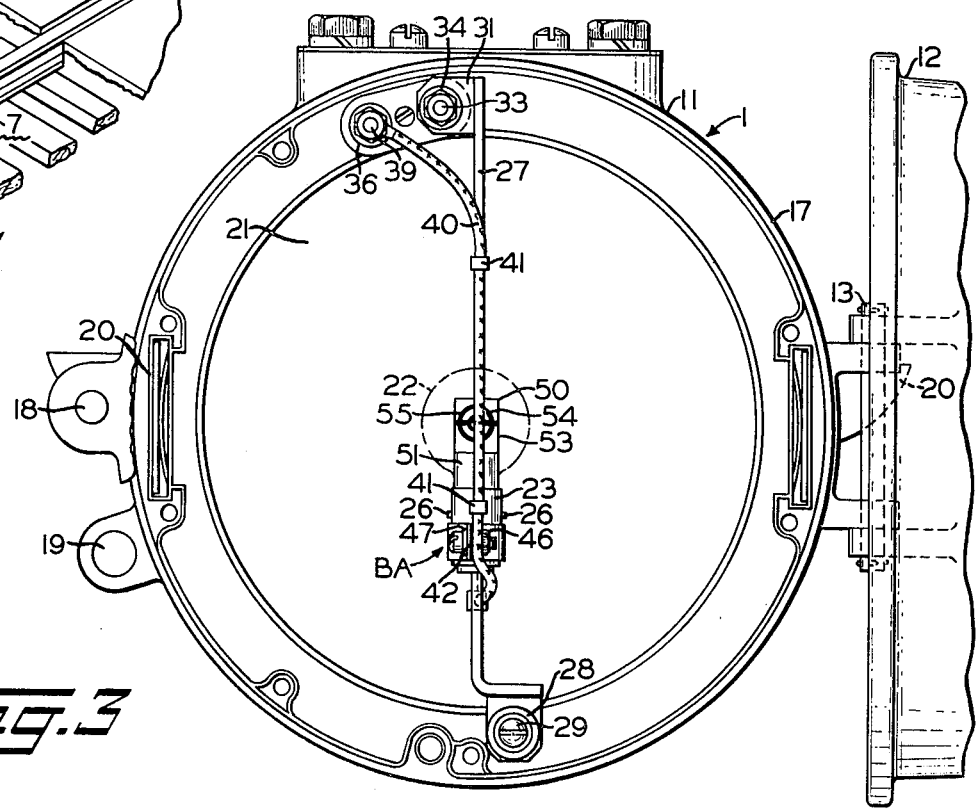

METHOD OF LOCATING A LIGHT AT THE FOCAL POINT OF A CONCAVE MIRROR OF A SIGNAL LAMP UNIT

FIELD OF THE INVENTION

This invention relates to a unique method of focusing a light bulb of a signal lamp unit and, more particularly, to an improved method of locating the filament of a light bulb at the focal point of a parabolic mirror employing an optical instrument having a base for insertion into the electrical socket of the light bulb of a signal lamp unit and having a translucent target for imaging a distant object at the focal point of the parabolic mirror by moving the electrical socket and replacing the optical instrument with a light bulb so that the illuminative efficiency of the signal lamp unit is maximized for effectively forwarning motorists and pedestrians at a railroad-highway grade crossing installation.

BACKGROUND OF THE INVENTION

In certain signal lamp installations, such as, in railroad-highway crossing warning apparatus, flashing lights are used to visually forewarn oncoming motorists and pedes trians of approaching trains and/or mass transit vehicles. In typical highway crossing signal lamp units, an incandescent light bulb having a concentrated filament is used in combination with an adjustable socket bracket, a parabolic reflective mirror and a colored lens to project the parallel light rays in a predetermined direction. In order to maximize the effectiveness of the parabolic reflector, it is essential that the light-emitting filament of the incandescent light bulb must be located at the focal point of the parabola. Under such a condition, the impinging radiant energy or light rays are reflected in a parallel direction from the surface of the parabolic mirror so that a highly concentrated source of light is viewed by even distant motorists in plenty of time to stop their vehicles as they approach the highway crossing. Thus, it will be seen that this precise focusing of the light bulb allows the motorists to be alerted at substantially a greater distance from the crossing than if the filament was not situated of the focal point of the parabolic reflective mirror. In prior art signal lamp units, it was common practice to employ integral sighting tubes or finders to determine when the filament of the lamp was situated at the focal point of the concave mirror. It will be appreciated that such an integral sighting device, which included a sight tube carrying a lens and a ground glass plate having cross-hairs upon which an image of the filament was focused, not only increases the initial purchase cost but also results in a somewhat heavier and bulkier signal lamp unit. In addition, there were other prior art focusing devices which took the form of jigs which could be repeatedly used on and transferred from one lamp unit to the next in establishing the focal point of a lens of reflective mirror. However, these previous lamp filament locators were relatively complex and were normally designed for a specific type or model of signal lamp units. Thus, while these prior art types of focal point finders were usually successfully used in locating and positioning the filament of a light bulb at the focal point of a lens or reflector in signal lamp units, they were relatively expensive to make and were highly complex to set up and operate. In addition to their initial manufacturing cost, these removable sighting devices were expensive to operate since they required an undue amount of time to attach and detach them to the lamp units. Thus, it is desirable and highly advantageous to utilize an inexpensive and simple sighting device which may be quickly and easily mounted to the signal lamp units for effectively focusing in the filament of a light bulb and which may be facilely and readily disconnected therefrom. Further, the proposed focal point sighting device should be adapted for universal usage on various models or types of signal lamp units. Hence, in order to maximize the efficiency of a signal lamp unit at the least cost, it is fundamental to provide a unique method of quickly and easily sighting in and locating the filament of a light bulb at the focal point of a parabolic mirror.

OBJECTS OF THE INVENTION

Accordingly, it is an object of this invention to provide a new and improved method of setting the filament of a lamp at the focal point of a smooth concave mirror of a signal light.

Another object of this invention is to provide a unique method of focusing a light bulb of a signal lamp unit by placing a sighting device into the socket of the light bulb and positioning the socket and sighting device until an image comes into focus on the reticle from a polished reflector.

A further object of this invention is to provide a novel method of establishing the focal point of a parabolic mirror of a signal lamp unit employing an optical instrument which fits into the socket of the electrical lamp.

Yet another object of this invention is to provide an improved method of locating the filament of a light bulb at the focal point of a parabolic reflector of a signal lamp unit by placing a sighting device into the socket of the light bulb and moving the sight device and socket until a reflected image is centered on the target of the sighting device.

Yet a further object of this invention is to provide an enhanced method of positioning the filament of a lamp at the focal point of a concave mirror of a signal lamp unit by utilizing an optical instrument which is adapted to fit into the socket of the lamp.

Still another object of this invention is to provide a method of setting the filament of a lamp at the focal point of a smooth concave reflector of a signal light involving the steps of placing a sighting device having a reticle into the socket of a lamp, positioning the socket and the sight device until an image comes into focus on the reticle from the smooth surface reflector and replacing the sighting device with a lamp.

Still a further object of this invention is to provide a method of focusing a light bulb of a signal lamp unit comprising the steps of placing the base of an optical instrument into the socket of the light bulb, adjusting a bracket carrying the socket for situating a reticle of the optical instrument at the focal point of a parabolic reflector, removing the optical instrument from the socket and placing a light bulb into the socket whereby the filament is situated at the focal point of the parabolic reflector.

An additional object of this invention is to provide a method of maximizing the illuminative effeciency of a signal lamp unit which is economical in cost, simple in design, reliable in use, efficient in operation and easy to set up.

SUMMARY OF THE INVENTION

In accordance with the present invention, there is provided a method or process of maximizing the illuminative efficiency of a signal lamp unit by focusing the filament of a light bulb at the focal point of a smooth surface parabolic mirror of the signal lamp unit. The method includes the use of an optical sighting device having a base portion and a translucent target portion provided with a reticle. The lamp unit includes an adjustable bracket assembly having a socket or receptacle to receive the light bulb. The socket is vertically adjustably mounted at one end in a circular retaining portion of an elongated clamp. The other end of the clamp which is made of a pair of symmetrical band member includes longitudinal slots for receiving a screw and nut for fastening to a bracket member. The bracket member is mounted on the inside of the metallic case of the lamp unit, and the slots permit the clamp to be longitudinally moved toward and away from the parabolic mirror. Lateral movement and adjustment may be achieved by selectively placing shims or washers either between the screw head and bracket member or between the nut and the bracket member. Further, vertical adjustment is provided along the vertical axis of the bulbsocket assembly by allowing the socket to slide or to be moved between the clamp halves when loosened. The method of focusing involves the steps of: placing the base portion of the optical sighting device into the socket or receptacle, adjusting the optical sighting sight device by selectively vertically moving the socket and/or selectively longitudinally moving the clamp and/or selectively laterally moving the clamp until a distant image is focused onto the reticle of translucent target portion, removing the sighting device from the socket and replacing it with a light bulb wherein the filament of the light bulb will be situated at the focal point of the parabolic mirror of the signal lamp unit.

DESCRIPTION OF THE DRAWINGS

The foregoing objects and other attendant features and advantages of this invention will be more readily appreciated and will be more clearly understood by reference to the following detailed description when considered in conjunction with the accompanying drawings wherein:

FIG. 1 is a perspective view of a highway crossing signal utilizing flashing signal lamp units which effectively protect approaching pedestrians and motorists from oncoming trains and/or mass or rapid transit vehicles.

FIG. 2 is an enlarged partial sectional elevational view of one of the signal lamp units of FIG. 1 in which the hinged door is opened and is partially shown.

FIG. 3 is a front elevational view of the signal lamp unit of FIG. 2.

DETAILED DESCRIPTION OF THE INVENTION

Referring now to the drawings, and in particular to FIG. 1, there is shown a railroad-highway flashing signal including a pair of signal lamp units 1 mounted on a cross arm 2 which is carried by a mast or pole 3. Each of the signal lamp units includes a hood 1a and a background disc 1b. The mast 3 is mounted in a base member which is suitably secured, such as, being bolted to a concrete foundation 5 which is situated alongside of a highway or road 6 adjacent a grade crossing with a railroad 7. The warning signal S also includes cross arms 8 and 9 bearing the words "RAILROAD CROSSING" and a number of tracks guarded sign 10. The two flashing signal lamp units 1 are substantially identical in structure and therefore the essential details of only one unit will be described for the purpose of convenience.

Referring now to FIGS. 2 and 3, there is shown an electrical illuminated signal lamp unit 1 including a metal case 11 and a hinged door 12. The hinged door 12 is pivotally coupled to the case 11 by hinge pin 13 and a spreading light cover lens 14 is mounted to the door 12 by spring clips 15 which are screwed to the inside annular periphery of door 12. An outer annular rubber gasket 16 engages the peripheral edge 17 of case 11 to provide a moisture and dirt-free seal when the foor 12 is closed and is drawn shut by tightening bolt 18. The lamp unit is generally locked by means of a padlock (not shown) which has its shackle passing through apertured ears or tabs formed on door member 12 and case 11, as indicated by numeral 19 in FIG. 3, to prevent tampering and opening of the case by unauthorized individuals or persons. A hooded or shielded viewing window 20 is located on each side of case 11 for inspection purposes to observe and determine if the light is functioning in daylight hours.

As shown in FIGS. 2 and 3, the light or radiant energy projecting system includes two essential elements or parts, namely, a concave smooth surface mirror or highly polished parabolic reflector 21 and an incandescent light bulb 22, shown in phantom, having a concentrated filament. The light bulb is preferably a miniature candelabra lamp having a bayonet base which is adapted to be fitted into a socket or receptacle 23. The parabolic mirror 21 is suitably secured to the inside of case 11 and is situated adjacent the dished back wall 11a of the case. As shown, sponge rubber or other suitable vibration absorbment material strips are glued by a suitable adhesive to the inner surface of wall 11a and to the outer surface to securely hold the mirror 21 in place. The metallic lamp socket 23 has oppositely disposed elongated slots 25 which terminate in upwardly directed pocket for accommodating laterally extending pins 26. The socket 23 is adapted to be carried by an adjustable bracket assembly BA which is mounted within the confines of the case 11. It will be seen that the adjustable assembly BA includes an elongated plate bracket member 27 which diametrically extends across the width of the circular case 11. As shown, the lower end of the bracket member 27 is first bent 90° to form a tab 28. The flat tab 28 is provided with a hole or aperture for accommodating a screw 29 which is threaded into cast spacer member 30 which is drilled and tapped. A pair of spacer washers 28 are disposed on each side of tab 31 for positioning purposes. Similarly, the upper end of bracket 27 includes an offset apertured tab 31 which is rigidly held in relationship with a cast spacer member 32 by a terminal bolt 33 and a pair of nuts 34 and 35. An insulative terminal block 36 is mounted to the spacer 32 by a screw 37 and a nonconductive spacing sleeve 38 is located intermediate block 36 and tab 31 for positioning purposes. The insulative block 36 includes a terminal contact bolt 39 to which is connected an electrical lead 40. The lead 40 which supplied electrical power to illuminate light bulb 22 is attached to the outer edge of bracket 27 by U-shaped spring clips 41 and is connected to the bottom of the single or one contact 35 of socket 23. As shown, the socket 23 is mounted at the end of a clamp 42 which is made up to two elongated metallic strap members. To facilitate positioning, the socket 23 is slidably vertically in a contractible ring-like retaining portion 43 formed at the remote end of the strap members of clamp 42. By loosening screws 43 and 44, the socket 23 may be shifted upwardly or downwardly as desired, and by tightening screws 43 and 44, the socket may be locked in the adjusted position. The other ends of band members of clamp 42 are provided with elongated slots 45 which accommodate a fastening means, such as, screw and nut 46, for holding the clamp 42 to bracket 27. The longitudinal slots 45 permit the socket 23 to be horizontally moved toward and away from the parabolic mirror 21, as the situation demands. Further, it will be seen that a number of shims or washers 47 are positioned between the head of screw 46 and clamp 42 which allows the socket 23 to be adjusted laterally with respect to the vertical center line of the parabolic mirror 21. Thus, by adding additional shims 47 or by removing any unwanted shims or washers 47, the socket 23 may be displaced to the left or right, respectively, as viewed in FIG. 3. Hence, the socket 23 may be moved and adjusted in any of three directions relative to the parabolic mirror 21.

Now, let us assume that the signal lamp unit 1 has been completely assembled with exception of the insertion of the light bulb 22 into socket 23. In order to maximize the effectiveness of the signal lamp, it is necessary to situate the concentrated filament of the light bulb at the focal point of the parabolic mirror 21. The focusing of the signal lamp 1 is readily accomplished in the present invention by employing an optical sight device or instrument 50. The optical instrument 50 includes a brass cylindrical base portion 51 having a pair of opposed ears comparable to pins 26 which fit into slots 25 of socket 23. The upper end of base 51 is provided with an elongated slot 52 into which is secured a rectangular translucent glass or plastic target member 53. The translucent target 53 includes a self-adhesive plastic film 54 having a reticle or cross-hairs 55. The reticle takes the form of four opaque quadrant lines and two opaque concentric circles imprinted on a sheet of film which is then glued to the frosted front surface of plastic member 51. The base 52 of the optical instrument 50 is inserted into socket 23 with its pins following slots 25 and is twisted in a counterclockwise direction to lock it in place. Thus, the center of the target will simulate the position at which the filament of a light bulb will be situated when inserted into the socket 23. In focusing the optical instrument, an observer or workman simply peers through the translucent target member 53 and attempts to image a distant object, such as, represented by vertical arrow A. A clear image will be observed when the reticle 55 is situated at the focal point of the parabolic mirror 21. In order to properly locate the reticle 55, it may be necessary to move and adjust the socket 23 in any one, two or all three directions. As previously mentioned, the socket 23 may be slid upwardly or downwardly in the retaining ring as viewed in FIG. 2 by loosening screws 43 and 44. Additionally, the socket 23 may be moved toward or away from mirror 21 by lossening screw 46 and may also be shifted to the left or right by adding or removing one or more of the shim washers 47, respectively. After the reticle is located at the focal point of mirror 21, the optical instrument is quickly and easily removed and replaced by a light bulb 22 which inherently results in the filament being located at the focal point of the parabolic mirror 21 wherein the illuminative effeciency of the signal lamp is maximized by insuring the light rays emerge in parallel direction off of the parabolic reflector. Thus, the signal lamp is facilely and readily focused with a minimum of effort and in a comparatively short period of time. The process of setting the filament of a lamp at the focal point of a concave mirror may be set up as one of the steps in an assembly line type of operation.

It will be appreciated that the presently described method or process may be used with other types of signal lamp units, such as, traffic lights, spot lights, semaphore lamps or the like.

In addition, it is understood that various changes, modifications and alterations may be made by persons skilled in the art without departing from the spirit and scope of the present invention. Accordingly, while the invention has been illustrated and described with reference to a preferred construction and embodiment, it is understood tht the disclosed arrangement is susceptible to various adaptations and changes without departing from the spirit and scope of the invention and, therefore, such changes, modifications and variations are herein meant to be encompassed within the purview of the appended claims.

Having now described the invention, what I claim as new and desire to secure by Letters Patent, is:

1. A method of setting the filament of a lamp at the focal point of a smooth concave reflector of a signal light comprising the steps of:
   (a) placing a sighting device having a reticle into the socket of the lamp,
   (b) positioning the socket and said sighting device until an image comes into focus on said reticle from the smooth surface reflector, and
   (c) replacing said sighting device with a lamp.

2. The method as defined in claim 1, wherein the step of positioning the socket and sighting device entails movement in any of three directions.

3. The method as defined in claim 1, wherein the step of placing the sighting device involves inserting and twisting a base portion into the socket.

4. The method as defined in claim 1, wherein the step of positioning the socket and sighting device involves loosening fasteners, shifting the socket in any of three directions and then tightening the fasteners.

5. A method of focusing a light bulb of a signal lamp unit which comprises the steps of:
   (a) placing the base of an optical instrument into the socket of the light bulb,
   (b) adjusting a bracket assembly carrying the socket for situating a reticle of the optical instrument at the focal point of a parabolic reflector by imaging an object on said reticle,
   (c) removing the optical instrument from the socket, and
   (d) placing a light bulb into the socket whereby the filament is situated at the focal point of the parabolic reflector.

6. The method as defined in claim 5, wherein the step of adjusting the bracket assembly involves shifting the socket toward and away from the parabolic reflector.

7. The method as defined in claim 5, wherein the step of adjusting the bracket assembly involves shifting the socket laterally relative to the parabolic reflector.

8. The method as defined in claim 5, wherein the step of adjusting the bracket assembly involves shifting the socket vertically reflective to the parabolic reflector.

9. The method as defined in claim 5, wherein the step of placing the base of the optical instrument into the socket involves an inserting and twisting action to lock the base in the socket.

10. The method as defined in claim 1, wherein the step of removing the optical instrument from the socket involves a twisting and pulling action to unlock the base from the socket.

* * * * *